July 28, 1936.  F. A. DAHLGREN  2,048,998
MEANS FOR RECTIFYING ELECTRIC CURRENT
Filed Jan. 26, 1934  3 Sheets-Sheet 1

INVENTOR
F. A. DAHLGREN.
By Marks & Clerk
Attys.

July 28, 1936.   F. A. DAHLGREN   2,048,998
MEANS FOR RECTIFYING ELECTRIC CURRENT
Filed Jan. 26, 1934   3 Sheets-Sheet 3
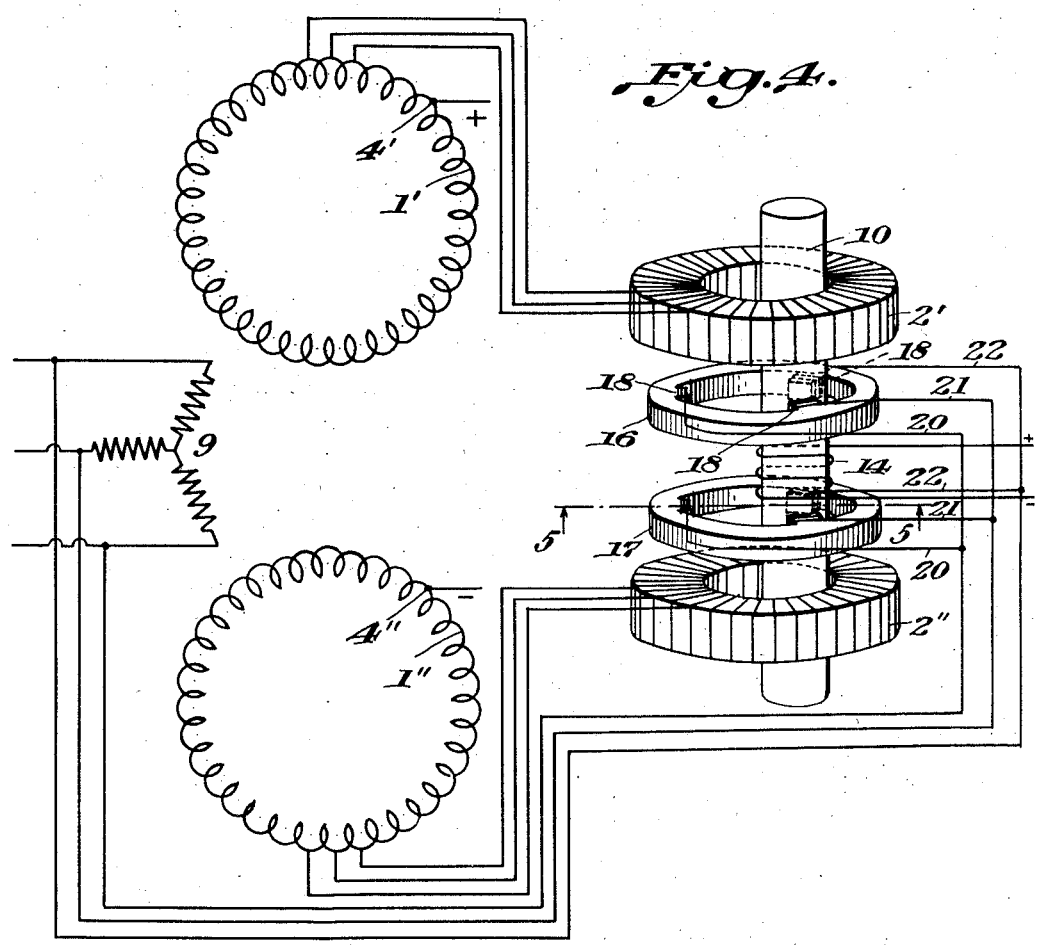
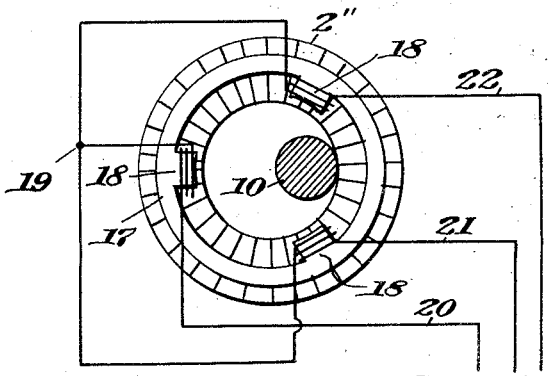
Inventor;
F. A. Dahlgren
Glascock Downing & Seebold
By:   Attys.

Patented July 28, 1936

2,048,998

UNITED STATES PATENT OFFICE 2,048,998

MEANS FOR RECTIFYING ELECTRIC CURRENT

Fredrik Axel Dahlgren, Stockholm, Sweden

Application January 26, 1934, Serial No. 708,474
In Sweden January 27, 1933

1 Claim. (Cl. 171—123)

This invention relates to improved means for rectifying electric currents produced in an induction winding by a magnetic field rotating in relation to said winding, which in the known way is provided with a number of symmetrically arranged tappings leading to corresponding commutator segments.

The object of the invention is to provide such a commutator connecting arrangement that a rectified current of a constant voltage can be tapped off from said windings. The invention can be utilized to advantage in connection with electric current converters and generators for producing a direct current.

The nature of the invention is diagrammatically illustrated on the accompanying drawings in which;

Fig. 4 illustrates diagrammatically a second embodiment of the invention.

Fig. 5 is a transverse sectional view taken on the line 5—5 of Fig. 4.

Figure 2:
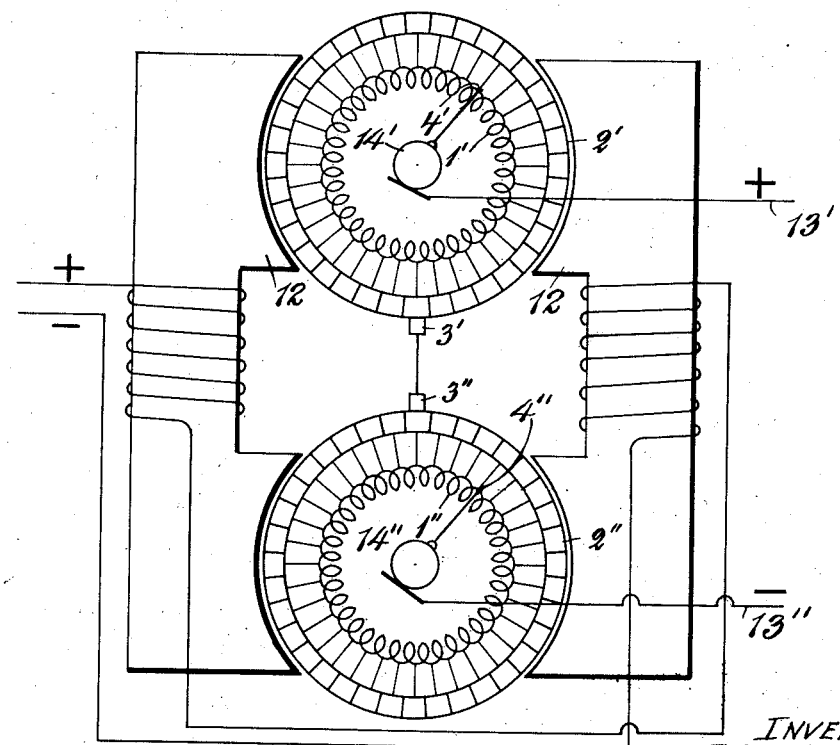
Fig. 2 illustrates diagrammatically one embodiment of the invention.

The two induction windings and the two commutators in the embodiments according to Figs. 2 and 4 are in reality arranged coaxially, but for the sake of clearness only they have on the drawings been illustrated side by side. In a similar way the magnetic field system in Fig. 2 has been illustrated.

Figure 1:
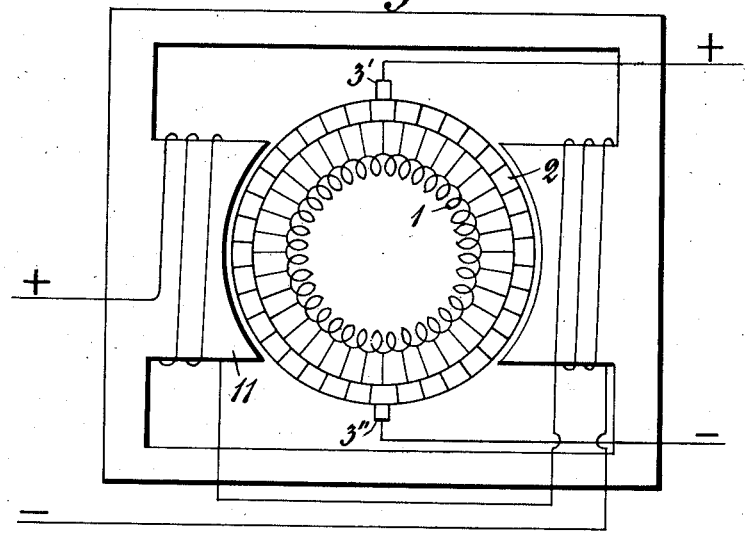
Fig. 1 illustrates diagrammatically the hitherto commonly used commutator connecting arrangement between a direct current line and a rotating induction winding.

In Fig. 1 disclosing a known commutator connecting arrangement, 1 designates a rotating induction winding, which is symmetrically arranged on an iron core and exposed to the inductive action of a fixed field generated by the stationary field-system 11. The winding 1 is provided with a number of tappings, distributed at mutually equal electrical distances, and connected to the respective segments of a commutator 2. The commutator 2 is connected to the direct current line by two brushes 3′ and 3″ arranged diametrically opposite each other, so that the brushes always are in contact with segments between which a maximal or nearly maximal difference of potential is obtained.

Under certain circumstances it is, however, desirable to utilize a different mode of connection, where the direct current leads are not connected to the brushes but to fixed points on the armature windings.

In cases where the armature winding rotates and the magnetic field is stationary, especially in the case of a very narrow totally enclosed machine, where the brush holders are difficult to connect to other leads, it is easier to take out the direct current over slip-rings, which can be placed outside of a bearing and connected to the armature winding by means of cables running for example through the bore of a hollow shaft.

In cases where the armature winding is stationary and the magnetic field is a rotating one, it is desirable to avoid insulation of the rolling contact body as well as the slip-contacts for taking out current from said contact body.

These and other objects have been realized according to the present invention, as will be more clearly set forth below in connection with the description of the embodiments of the invention illustrated in Figs. 2 and 4.

According to Figure 2 the induction winding consists of two identical and magnetically intimately interconnected but electrically separated windings 1′ and 1″. The windings are connected to the segments of two commutators 2′, 2″ respectively by means of symmetrically distributed tappings. The commutators cooperate with two brushes or other suitable contact devices 3′ and 3″ respectively, which are directly connected to each other and arranged to move in relation to and along said commutators.

An E. M. F. is induced in the coils of the windings 1′, 1″ by a magnetic field rotating in relation to said windings. In the amendment illustrated in Fig. 2, the windings 1′, 1″ rotate and the magnetic field is fixed and generated by the stationary field-system 12 as indicated diagrammatically. The brushes 3′ and 3″ or other contact devices for the commutators are in this embodiment stationary.

The brushes 3′ and 3″ are arranged to move in relation to and along the commutators synchronously with the potential of the commutator segments and in such phase position that the brushes at each moment will be in contact with segments on the respective commutators having, the one substantially a maximum positive potential and the other substantially a maximal negative potential in relation to the electric centre of the respective winding.

A rectified current is tapped off between two fixed points 4′ and 4″ respectively, one on each of said windings, which points are so located that they at each moment will have substantially equally high potential in relation to the electric centre of the windings 1′ and 1″ respectively so that a constant difference of potential will be obtained between said fixed points. The points 4′ and 4″ may be connected to the direct current line 13′, 13″ in the known way by means of rotating slip-rings 14′ and 14″ respectively.

Figure 3:
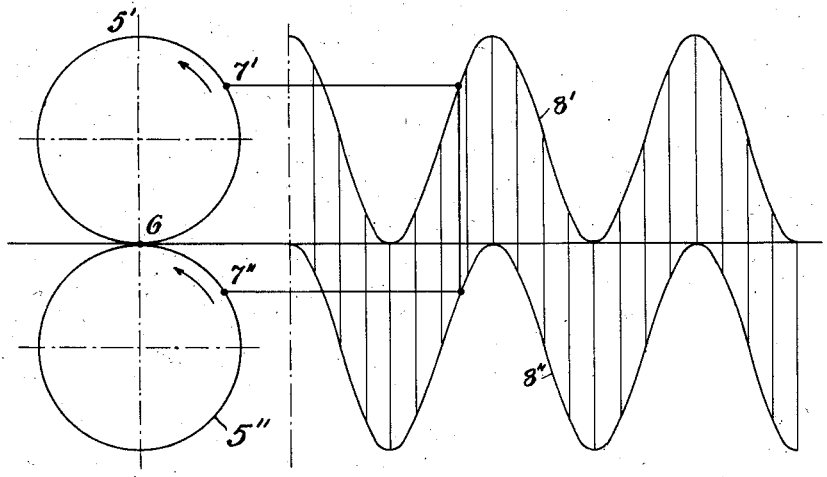
Fig. 3 illustrates diagrammatically the mode of operation of the embodiment disclosed in Fig. 2.

The mode of operation of the above described commutator connection is diagrammatically illustrated in Figure 3. The circles 5′ and 5″ illustrate the diagrams of potential of the windings 1' and 1'' respectively, which for the sake of simplicity have been supposed to operate with an infinite number of phases. The circles are thus supposed to rotate in the direction of the arrows, the difference of potential at any moment between a coil and the electrical centre of the winding being represented by the vertical projection of the radius drawn to the corresponding point on the respective circle. The two points, one on each winding, which momentarily are connected together by means of the brushes, will, of course, have the same potential, which is defined by the point 6. The fixed terminals of the outer current line are in the diagram designated by the points 7', 7'' respectively.

To the right in Figure 3 a wave diagram is disclosed in a system of rectangular coordinates, wherein the abscissas designate the time and the ordinates the momentary potentials 8' and 8'' of the respective points 7', 7'', the potential of the interconnected brushes being for the sake of simplicity supposed to be zero.

From the diagram it will be clearly understood that the difference of potential between the points 7' and 7'' always will be constant, although their potentials in relation to that of the brushes will vary. This is, however, of no importance, since the potential of any point of the winding always can be fixed, if not already fixed by galvanic connection to an existing current line.

In the above described way a constant difference of potential will thus be reached between two points with fixed connection to the respective windings.

This result is of considerable value in a plurality of constructions, especially in constructions, where the commutators and windings are stationary and the contact devices of the commutator rotate.

Figs. 4 and 5 illustrate diagrammatically such an embodiment of the invention. According to this embodiment the windings 1' and 1'' are stationary and arranged as the secondary winding of a poly-phase transformer, the primary winding of which is designated by 9. The poly-phase transformer generates a rotating magnetic field which produces an E. M. F. in the coils of the windings 1' and 1'', which by symmetrically distributed tappings are connected to segments of corresponding commutators 2' and 2'' respectively. The stationary brushes 3' and 3'' in Fig. 2 are here replaced by a contact body 10 of magnetic material which is in contact with both of the commutators 2' and 2'' and arranged to roll along the surface of the commutator segments, synchronously with the potential of the commutator segments, with such phase position and for the same purpose as the interconnected brushes 3', 3'' in Fig. 2, as set forth above. For this purpose the magnetic rolling body 10 is polarized by a direct current winding 14 and two armatures 16 and 17 are provided for generating a rotating field, the armatures being formed as rings arranged coaxial with the commutators 2' and 2''. Each armature is provided with three poles 18 the windings of which on one side are connected together at 19 (Fig. 5) and on the other side are connected to three leads 20, 21 and 22, connected to the windings of the primary windings 9 of the polyphase transformer. The bores of the armature rings 16 and 17 are of somewhat larger diameter than the bores of the commutators 2', 2'' so that the rolling body 10 is forced to roll along the segments in the bores of the commutators. The rotating magnetic field generated by the armatures 16 and 17 and the rotating magnetic field generated in the windings 1', 1'', are, of course, both synchronous with the field of the primary windings 9. Thus the action exerted by the armatures 16 and 17 upon the rolling body 10 will also be synchronous with the potential of the commutator segments.

An arrangement of this kind, which is connected according to the known system disclosed in Figure 1, would require two additional contact devices cooperating with the rolling body 10, and further the rolling body would have to be divided in at least two parts electrically insulated from each other. When using the mode of connection according to the invention, said additional contact devices will be wholly avoided, since the winding 1 is divided in two mutually insulated parts 1', 1'', each one of which is connected to a separate commutator 2', 2'' in the manner disclosed in Figure 4. This arrangement will operate in full accordance with the theory explained in connection with Figure 3.

Without departing from the principle of the invention, the same may be adapted for use in connection with a multitude of combinations of commutators and windings and both for rotating as well as stationary magnet systems and commutators. The arrangement of the winding as a coil winding or as a wave winding respectively as a poly-phase transformer winding has apparently no influence upon the principle of connection according to the invention. Further, the invention may be utilized for any number of poles and primary phases.

What I claim is:

Means for rectifying electric current comprising a poly-phase transformer, two electrically insulated stationary induction windings arranged as the secondary winding of said poly-phase transformer, two stationary commutators, symmetrically arranged tappings leading from one of said induction windings to the segments of one of said commutators, symmetrically arranged tappings leading from the second of said induction windings to the segments of the second of said commutators, a rolling contact body common to said commutators and arranged to roll along the surface of the commutators synchronously with the potential of the commutator segments and in such phase position that said contact body will at each moment connect commutator segments having on one commutator substantially a maximal positive potential and on the other commutator a substantially maximal negative potential in relation to the electric centre of the respective winding, electromagnetic means for imparting a rolling motion to said contact body along the surface of said commutators synchronously with the potential of the said poly-phase transformer, and means for tapping off a rectified current between two fixed points, one on each of said induction windings, which points are so located that at each moment they have substantially equally high potential in relation to the electric centre of the respective induction winding.

FREDRIK AXEL DAHLGREN.